June 6, 1950     G. R. SOUCIE     2,510,427

AQUARIUM AIR PUMP

Filed June 11, 1947

G. R. Soucie

INVENTOR

BY *CA Snow & Co.*

ATTORNEYS.

Patented June 6, 1950

2,510,427

UNITED STATES PATENT OFFICE 2,510,427

AQUARIUM AIR PUMP

George R. Soucie, South Brewer, Maine

Application June 11, 1947, Serial No. 753,985

1 Claim. (Cl. 230—69)

My present invention relates to the general class of fluid displacement pumps having automatic valve actions and more specifically to an improved aquarium air pump of the portable type, which while adapted for various purposes and uses, is especially designed for aerating the water content of an aquarium, as well as for supplying sufficient heat to the water to maintain a desired degree of temperature.

In carrying out my invention I employ in combination with the air pump an intermittently operating electrical circuit maker and breaker for an interior electrical heating unit of the pump whereby the pump is operated under alternate expansion and contraction of air in the pump chamber.

The primary object of the invention is the provision of a device of this character especially adapted for domestic use, which is composed of a minimum number of parts that may with facility be manufactured at low cost of production and assembled with convenience to constitute a compactly arranged and portable pump. The pump may be easily attached to and detached from a bowl or aquarium, and plugged into a conventional wall outlet box or electrical socket for automatic and noiseless operation.

The invention consists in certain novel features of construction and combinations and arrangements of parts as will hereinafter be described and more particularly set forth in the appended claim.

In the accompanying drawings I have illustrated a complete physical embodiment of my invention wherein the parts are combined and arranged in accord with one mode I have designed for the practical application of the principles of the invention. It will, however, be understood that changes and alterations are contemplated and may be made in these exemplifying drawings and mechanical structures within the scope of my claims, without departing from the principles of the invention.

Figure 2:
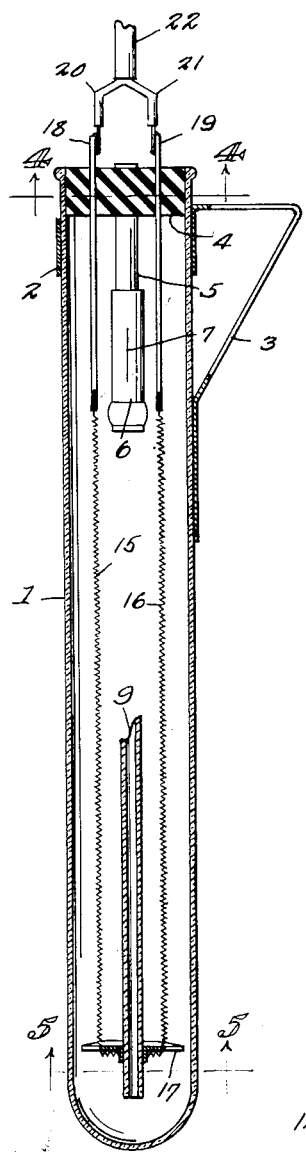
Figure 2 is a vertical sectional view of the device with parts in elevation.
Figure 3:
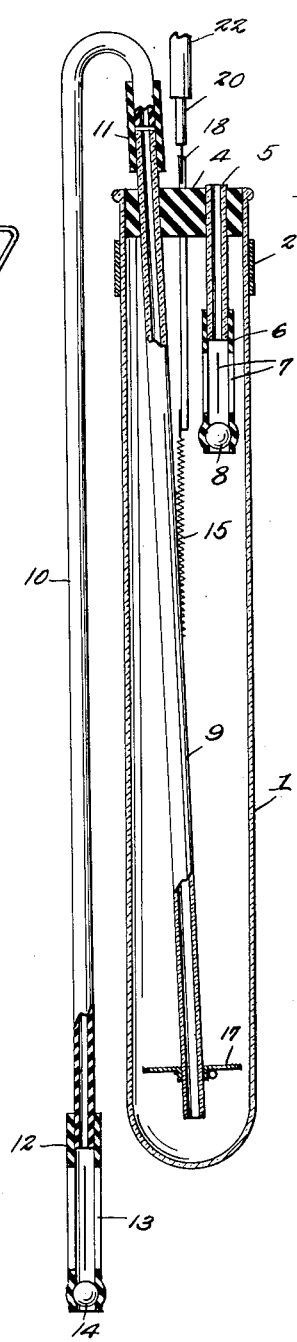
Figure 3 is a similar view in a plane at right angles to the plane of Fig. 2.
Figure 1:
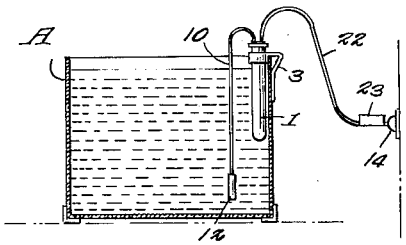
Figure 1 is an assembly view showing a conventional aquarium in section with an air pump embodying my invention mounted on the wall thereof and plugged in to a conventional electrical outlet box.
Figure 4:
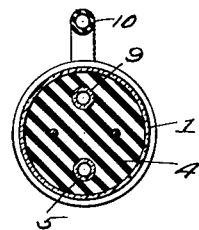
Figure 4 is a horizontal transverse sectional view at line 4—4 of Fig. 2 through the head of the pump.
Figure 5:
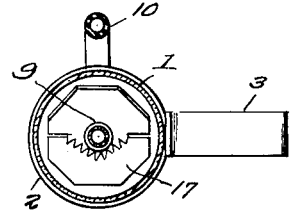
Figure 5 is a transverse sectional view at line 5—5 of Fig. 2.

In order that the general assembly and relation of parts may readily be understood I have depicted in Fig. 1 a conventional bowl or aquarium A, filled with water, with the aerating pump mounted thereon; and the pump includes a preferably cylindrical tube 1, of glass or other suitable material, that is provided near its upper end with a supporting collar 2 and a resilient clamp or clasp 3 by means of which the appliance is mounted on the wall of the aquarium.

The tube forms an interior air chamber for expansion and contraction of the contained air, and its upper end is closed and sealed by a plug 4 of rubber or other electrically insulating material, which together with the closed bottom of the tube forms an air tight chamber.

For supplying fresh air from the atmosphere a short pipe or air inlet duct 5 is mounted and sealed in the plug or head 4 of the tube and the lower end of the duct within the air chamber is equipped with a tubular valve 6 of rubber or other elastic material that is provided with a number of slots or slits 7, and closed at its lower end by a check valve or ball 8.

As indicated in Fig. 1 the pump is mounted with the tube projecting a desired distance down through the water of the aquarium, and for discharging air from the air chamber an air outlet pipe 9 is mounted and sealed in the head 4 with its lower open end terminating slightly above the closed bottom of the tube. The upper end of the discharge pipe or outlet pipe projects an ample distance above the head to receive a flexible discharge hose or tube 10 that is equipped with a nipple 11 for attachment to the exterior end of the air outlet pipe.

The flexible discharge pipe or hose 10 at its free end is equipped with an outlet valve similar to the air inlet valve, and the outlet valve which is submerged as shown includes an elastic tube 12 having a number of longitudinally extending slits or slots 13, and a check valve or ball 14 closing the lower end of the valve tube.

For heating and expanding the volume of air contained in the tubular housing, an electrical heating unit is provided that includes a number of spiral resistance coils preferably of nicrome wire, as 15, 16, that are ranged alongside the rigid outlet pipe 9 and attached at their lower ends to a transversely arranged base plate or support 17 rigidly mounted near the lower end of the outlet pipe. At their upper ends the coils are connected to conductor blades as 18 and 19, which form terminals that are spaced and mounted in the insulating head 4, and to the upper exterior ends of these conductor blades, the electric wires 20 and 21 of a cord or cable 22 are attached for electrical connection.

As indicated in Fig. 1 the cable or cord is provided with an intermittently operating circuit maker and breaker 23 of the flash signal type, and the cord or extension cable is plugged in or connected to a convential wall outlet or socket 24 for connection with the house wiring. As thus arranged the electrical heating unit is intermittently energized to heat and expand the air within the air chamber of the pump; and under expansion, air is forced from the otherwise sealed chamber through the outlet pipe and discharge hose, and thence through the discharge valve into the water of the aquarium for aerating purposes.

When the heating element is de-energized and the contained air contracts under cooling process, a flow of fresh air is induced from the atmosphere through the air inlet valve, and this fresh charge of air will be heated and expanded when the heating element is again energized, and the cycle of operation is again repeated.

The slotted and elastic air inlet and air outlet valves automatically control the flow of air to and from the otherwise sealed and constant-volume air chamber, and the ball of each of the elastic and slotted valves checks back pressure or flow of air through the respective valves.

Due to the moderate degree of heating the air within the air chamber, and consequent heating of the submerged air tube, the chill may be taken off the water content of the aquarium, and the water may thus be maintained at a desired degree of temperature. Or, if desirable, the aerating device may be mounted on the aquarium with the tube 1 exterior thereof, and only the discharge hose and discharge valve submerged in the water for aerating purposes, thus eliminating a substantial portion of created heat from the water content of the aquarium.

Having thus fully described my invention, what I claim as new and desire to secure by Letters Patent is:

In an aerating pump, a tubular housing having closed ends, an air inlet pipe extending through one of said ends, into the tubular housing, a valve normally closing the air inlet pipe, an outlet pipe passing through one end of the tubular housing, extending to a point adjacent to the bottom of the tubular housing, a base plate secured to the air outlet pipe, resistance coils secured to the base plate and disposed on opposite sides of the air outlet pipe, an electric circuit including a source of electricity supply, an intermittently operating switch connected with said resistance coils whereby said resistance coils are intermittently energized, heating the air in said housing at intervals, said air outlet pipe adapted to be extended into a tank containing water supplying air to the water, and a clamp secured to the housing by means of which the housing is clamped over the edge of a water tank.

GEORGE R. SOUCIE.

REFERENCES CITED

The following references are of record in the file of this patent:

UNITED STATES PATENTS

| Number | Name | Date |
|---|---|---|
| 425,530 | Wayte | Apr. 15, 1890 |
| 1,630,943 | Hutton | May 31, 1927 |
| 2,201,703 | Sage | May 21, 1940 |
| 2,346,841 | Henderson | Apr. 18, 1944 |
| 2,408,306 | Flournoy | Sept. 24, 1946 |

FOREIGN PATENTS

| Number | Country | Date |
|---|---|---|
| 521,315 | Germany | Nov. 21, 1928 |